May 4, 1965
R. L. OHMSTEDE
3,181,347
TUBE BUNDLE TESTING EQUIPMENT
Filed April 5, 1962
2 Sheets-Sheet 1
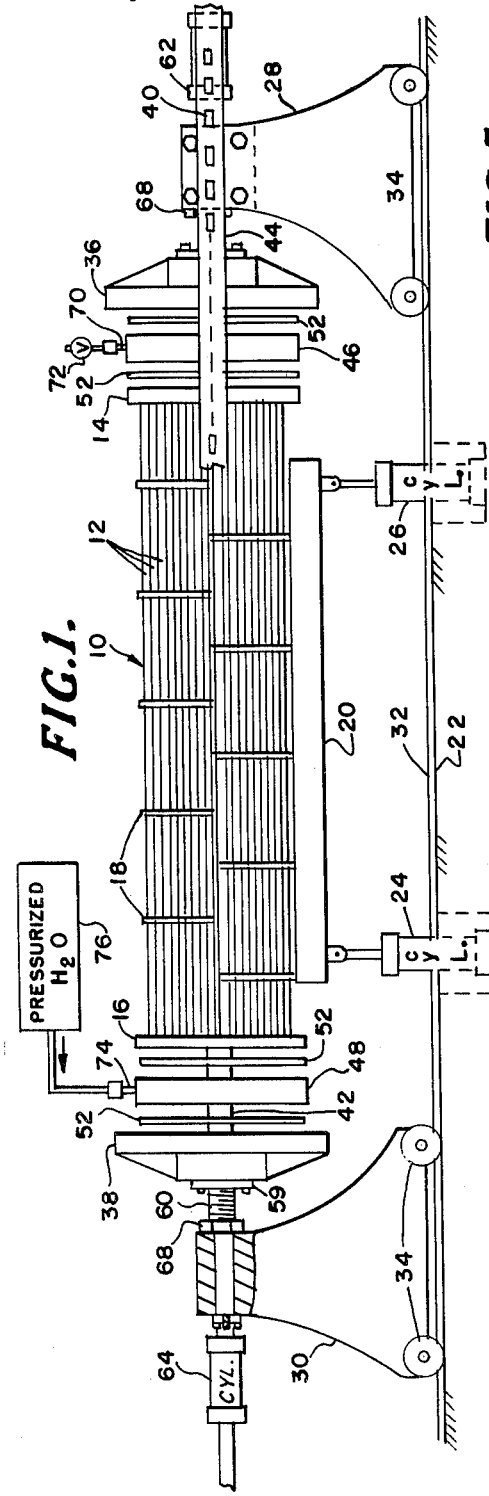
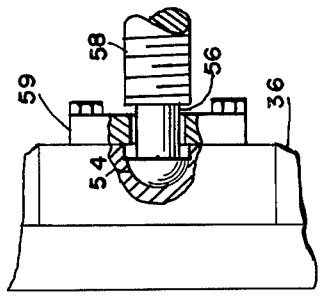
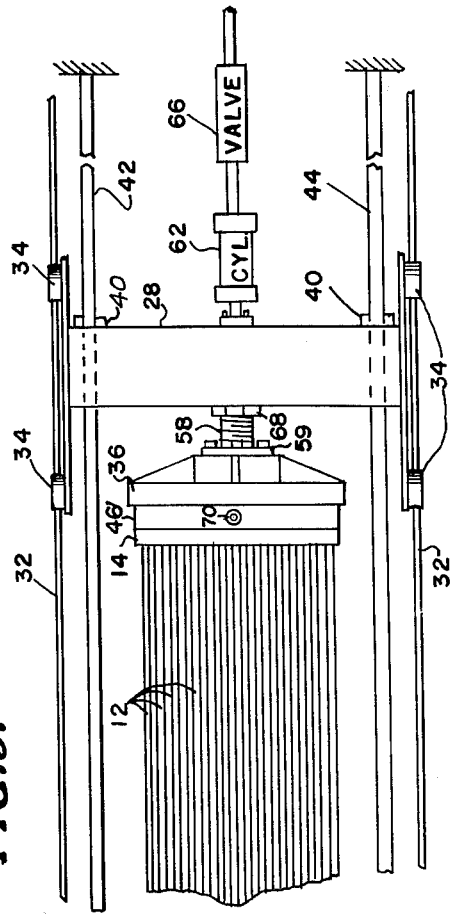
INVENTOR
ROBERT L. OHMSTEDE
BY *Cushman, Darby & Cushman*
ATTORNEYS May 4, 1965 R. L. OHMSTEDE 3,181,347
TUBE BUNDLE TESTING EQUIPMENT
Filed April 5, 1962 2 Sheets-Sheet 2
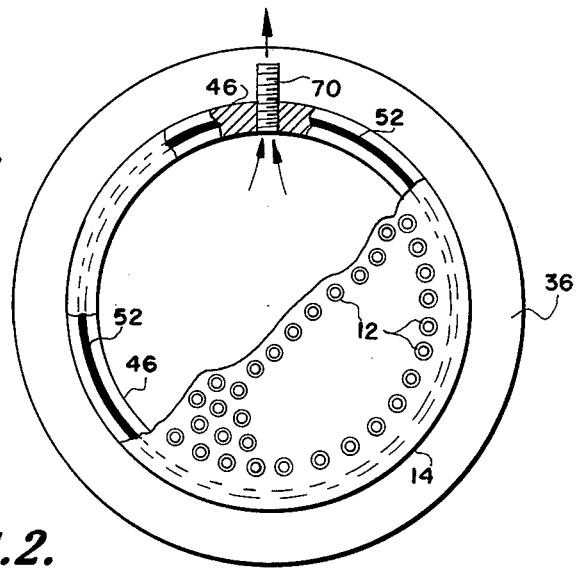
FIG.6.
FIG.2.
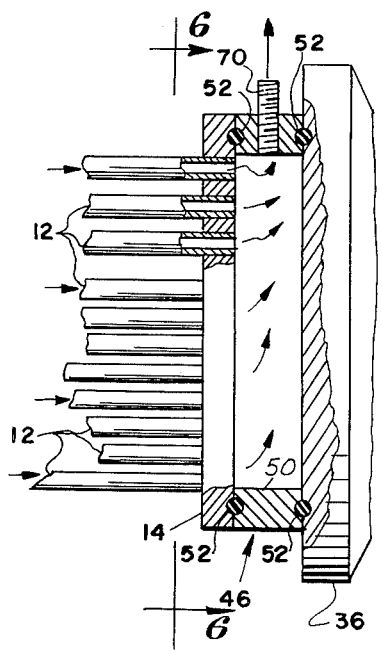
FIG.4.
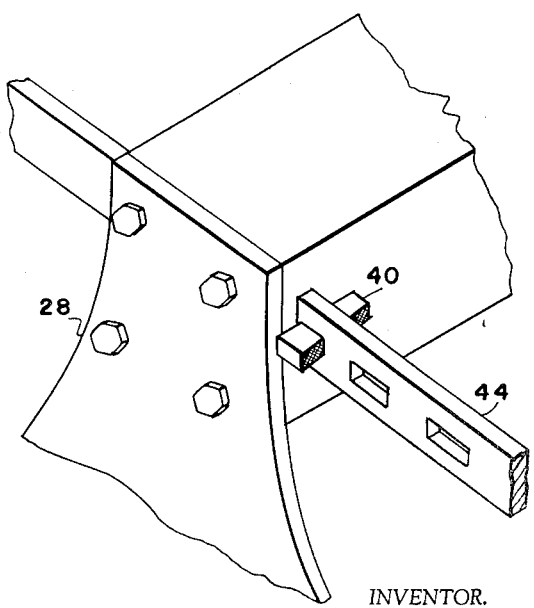
INVENTOR.
ROBERT L. OHMSTEDE
BY
Cushman, Darby & Cushman
ATTORNEYS

United States Patent Office 3,181,347
Patented May 4, 1965

3,181,347
TUBE BUNDLE TESTING EQUIPMENT
Robert L. Ohmstede, Beaumont, Tex., assignor to Ohmstede Machine Works, Inc., Beaumont, Tex., a corporation of Texas
Filed Apr. 5, 1962, Ser. No. 185,336
6 Claims. (Cl. 73—49.1)

This invention relates to apparatus for testing a plurality of sealed tubes or pipes simultaneously for leaks, and has for its main object the provision of such testing equipment operative to accommodate bundles of tubes of varying lengths and over-all diameters.

A tube bundle as known in the art is a group of tubes or straight pipes which has its tubes connected at each end to end plates, or so-called tube sheets, through which each tube opens. The tube sheets have apertures into which the respective tube ends are inserted and sealed thereto by conventional means. Such tube bundles are utilized in many different settings, for conveying fluid usually under pressure, for example, as regular conveying lines, or as an integral part of various types of heat transfer equipment, such as condensers, heat exchangers, air conditioning units, evaporators, economizers, and air heaters, to name but a few. Regardless of the eventual purpose of any bundle of tubes, it is apparent that same needs to be tested, perhaps initially or at various times throughout its life, to determine whether any tube in the bundle, or any seal between the outside diameter of the tubes and the holes in the tube sheets in which they are inserted, will leak. It is customary in the art to test a tube bundle by subjecting each of the tubes therein to fluid under a predetermined amount of pressure, to determine whether each of the tubes can withstand that much pressure. Previously, it has been necessary to clamp or bolt testing heads to the tube sheets of the bundle in order to perform the tests, but this is a very slow and tedious method of testing.

It is an object of this invention to provide improved tube bundle testing equipment which obviates the objections to prior art testing procedures, and which in one embodiment provides the ability to test tube bundles for leaks, regardless of the length of the bundle or its overall diameter.

Other objects and advantages of this invention will become apparent upon reading the appended claims and the following detailed description in conjunction with the attached drawings in which:

FIGURE 1 is a side elevational view with parts broken away,

FIGURE 2 is a partial view of the equipment showing an adapter ring disposed between a pressure plate and tube sheet, partially in cross section, FIGURE 3 is a fragmentary plan view, FIGURE 4 is a portion of the apparatus of FIGURES 1 and 3 showing a detail of the tie bar locking means, FIGURE 5 is an illustration of another detail of the equipment, and FIGURE 6 is a view taken approximately along the lines 6—6 of FIGURE 2 with parts broken away.

A conventional tube bundle 10 is shown in FIGURE 1 with each of the multiplicity of tubes 12 sealingly entering and extending through the respective end plates or tube sheets 14 and 16. Thus, tubes 12 open through the tube sheets, as shown in FIGURE 2. According to the length of tubes 12, they may be intermediately braced by one or more ribs or struts 18, as desired.

Tube bundle 10 is horizontally supported on cradle 20, which in turn is lifted to a predetermined height above the floor level 22 and leveled by independent operation of hydraulic cylinders 24 and 26. Carriages 28 and 30 are movable toward and away from each other, i.e., in a direction longitudinal with respect to bundle 10, on a pair of spaced tracks 32 by virtue of wheels 34 that will not allow substantial transverse movement of carriages 28 and 30. With the tube bundle 10 at the proper height, carriages 28 and 30 are moved relatively toward each other to a position such that pressure plates 36 and 38 are approximately six inches for example, from tube sheets 14 and 16 respectively. At this position the carriages are locked to prevent outward movement of either, by insertion of wedges 40 (see FIGURES 3 and 4) into the adjacent apertures in tie bars 42 and 44. These tie bars extend through an aperture on each side of each one of the carriages 28 and 30, near the top thereof, and when the wedges or shoes 40 are inserted into the respective tie bars or slots, neither carriage 28 nor 30 can move backwardly.

Next, a pair of adapter rings 46 and 48 is selected for the particular tube bundle to be tested. It is to be understood that there may be made to exist a different size pair of adapter rings for each different overall diameter of the various tube bundles that are to be tested by this equipment. The adapter rings in each different pair thereof has an internal diameter 50 (FIGURE 2) that is at least as great as the overall diameter that the tubes 12 form, in the respectively related tube bundle, by their openings into the respective tube sheet 14 or 16, and an outside diameter that is no greater than the face diameter of the respective pressure plate 36 or 38. The particular adapter rings selected from the various sizes thereof for use with the tube bundle to be tested are then made into sealing rings by inserting a sealing gasket or O-ring 52 into a premachined groove on each side of each of the adapter rings 46 and 48. These resulting sealing rings are then held in the position shown in FIGURE 1, manually or by any means desired, while pressure plates 36 and 38 are moved longitudinally inwardly, i.e., towards each other to effect a fluid seal between the tube sheets, sealing rings and pressure plates. The tube sheets and/or pressure plates may or may not, as desired, have grooves for receiving the O-rings 52 of the sealing rings.

In order to cause the respective sealing ring and pressure plate to align themselves invariably with the adjacent tube sheet, i.e., so that the tube sheet face and facing side of the adjacent sealing ring will always be parallel and not prevent an effective fluid seal, the pressure plates 36 and 38 are both preferably swivel mounted, at least to a limited extent. As shown in FIGURE 5, a swivel mounting of the pressure plate 36 may be effected by a ball and socket joint 54, with the socket being in the back side of the pressure plate and the ball being on the end of an unthreaded reduced diameter 56 of a threaded shaft or ram 58. A secured split ring or the like 60 around the reduced diameter portion of that ram serves as a limiting means as to the amount of swivel allowable.

Rams 58 and 60, which are respectively so-coupled to the pressure plates 36 and 38, extend through an aperture in the respective carriages 28 and 30, and are slideably mounted therein. Respective hydraulic cylinders 62 and 64 have thier pistons connected to rams 58 and 60, so that upon actuation of these cylinders, the rams are pushed forward (toward each other) to effect the fluid seal previously mentioned. Each of the hydraulic cylinders 62 and 64 is preferably equipped with a relief valve, such as 66, so that only the amount of pressure needed to establish metal to metal contact of the sealing rings, tube sheets, and pressure plates is applied.

As previously indicated, rams 58 and 60 are threaded, and this is for a portion of their length extending from the back side of the respective pressure plate, but the carriages 28 and 30 are not threaded, so the rams are free to slide therein as above mentioned. Each of the rams carries a lock nut 68, which after the fluid seals have been established, are tightened against the inside face of the respective carriages, to maintain the fluid seals even when pressure is subsequently applied internally via the sealing rings.

After the fluid seals are so established and locked by the lock nuts 68, the fluid connection 70 on the adapter ring 46, each adapter ring in each of the different pairs thereof having such a fluid connected, is connected to a valve 72, and the valve is opened for venting fluid therefrom. The fluid connection 74 on adapter ring 48 is then connected to a source 76 of fluid, for example water. This fluid passes through adapter ring 48 and drives the air out of each of the tubes 12 into adapter ring 46, causing the air to vent through valve 72. When all of the air is out of the tubes, valve 72 is closed, and the liquid pressure from source 76 is increased to a predetermined amount if it is not initially or already that high, to effect a pressure testing of each of the tubes 12 and its seal to the tube sheets 14 and 16.

For a different length or diameter of tube bundle, the same procedure for testing that bundle is followed as above described for bundle 10, and it is now apparent that the testing apparatus readily adapts to the testing of any size tube bundle.

Thus there has been described apparatus which accomplishes all of the objects and advantages herein indicated. It will be apparent to those of ordinary skill in the art upon reading this disclosure that the apparatus described may be modified in numerous ways, but the invention is to be limited not by the description of the specific embodiment illustrated, but by the appended claims.

What is claimed is:

1. Apparatus for leak testing tube bundles each having a plurality of tubes held together and normally sealed at their ends to respective end plates through which the tubes open, comprising a pair of pressure plates having opposed faces spaced apart more than said end plates, a pair of sealing rings respectively for said faces, said rings having an external diameter substantially no greater than the outer diameter of the respective face and an internal diameter greater than the diameter formed by all the tube openings in the respective end plate, at least one of said rings having a fluid connection for communicating fluid between its interior and exterior, and means for applying pressure, while said tubes are disposed with their said end plates respectively adjacent the said pressure plates and the said rings are respectively disposed between adjacent end and pressure plates, to at least one of said pressure plates to cause them to move relatively toward each other and effect a fluid seal by said rings so that fluid entering via said connection under a given pressure can escape only if a leak exists in one of said tubes or a tube to end plate seal, wherein said pressure applying means includes a ram connected to the rear side of one of said pressure plates, a ram carriage normally movable in the longitudinal direction of said tubes, means for preventing movement of said carriage in a longitudinally outward direction from a given point, said ram being slidably mounted on said carriage and having means cooperating with said carriage for preventing movement of said ram relative to said carriage in the said longitudinal outward direction more than a predetermined amount.

2. Apparatus as in claim 1 wherein at least one of said pressure plates is mounted for at least limited swivel movement so that it and the respective sealing ring will invariably align themselves with the adjacent tube end plate when pressure is applied as aforesaid to said pressure plates.

3. Apparatus as in claim 1 wherein each of said rings has an O ring seal on each of its faces.

4. Apparatus as in claim 1 and further including means for lifting and holding said tubes substantially horizontal with their end plates disposed as aforesaid.

5. Apparatus for testing for leaks or potential leaks in the tubes or seals thereof of each of a variety of tube bundles each of different length and diameter and having a respective size tube sheet at each end sealingly through which the tubes in the respective bundle open, comprising a pair of facing, spaced apart, pressure plates having faces with an outer diameter at least as large as that of the largest one of said tube sheets, a plurality of sealing ring pairs related respectively to said tube bundles, each pair of sealing rings having an internal diameter greater than the diameter formed by all the tube openings in the tube sheets of its related tube bundle and an outer diameter substantially no greater than that of the faces of said pressure plates, each of said rings having a respective fluid connection for communicating fluid between its interior and exterior, means for changing the distance between the said faces of said presure plates to accommodate the length of any of said tube bundles, means for moving a selected one of said tube bundles into the space between the faces of said plates with its said tube sheets at least approximately parallel to and spaced from an adjacent one of said plates, means for locking the said distance changing means to prevent movement of said plates outwardly longitudinally with respect to said tubes, and means for moving said plates under pressure relatively toward one another with the sealing rings of the said pair that is related to the selected tube bundle being in the aforesaid space between a different one of said plates and the adjacent tube sheet of the selected bundle to form a fluid seal therebetween.

6. Apparatus as in claim 5 wherein the said distance changing means includes two carriages movable on tracks toward and away from each other, said locking means being coupled to said carriages and comprising tie bar means extending longitudinally of said tracks and having a plurality of means to limit longitudinally outward movement of either of said carriages beyond any one of a plurality of predetermined points, said means for moving said plates toward one another including two rams respectively mounted with at least limited swivel movement to the outer sides of said plates and slidably carried by said carriages, said rams being threaded along at least part of their length extending from the respective pressure plate and carrying a respective locknut cooperating with the respective carriage after said fluid seal has been established to maintain that fluid seal thereafter until one of the locknuts is released.

References Cited by the Examiner

UNITED STATES PATENTS

| 131,405 | 9/72 | McGowan | 73—49.6 |
| 1,373,824 | 4/21 | McKenzie. | |
| 2,883,859 | 4/59 | Merrill | 73—49.6 |
| 2,896,445 | 7/59 | McNabb | 73—49.6 |
| 2,934,942 | 5/60 | Carrie | 73—49.1 X |
| 2,934,943 | 5/60 | Carrie | 73—49.6 X |
| 2,995,028 | 8/61 | Smith | 73—40 |

FOREIGN PATENTS 490,572  2/54  Italy.

ISAAC LISANN, *Primary Examiner.*